United States Patent Office 3,351,137
Patented Nov. 7, 1967

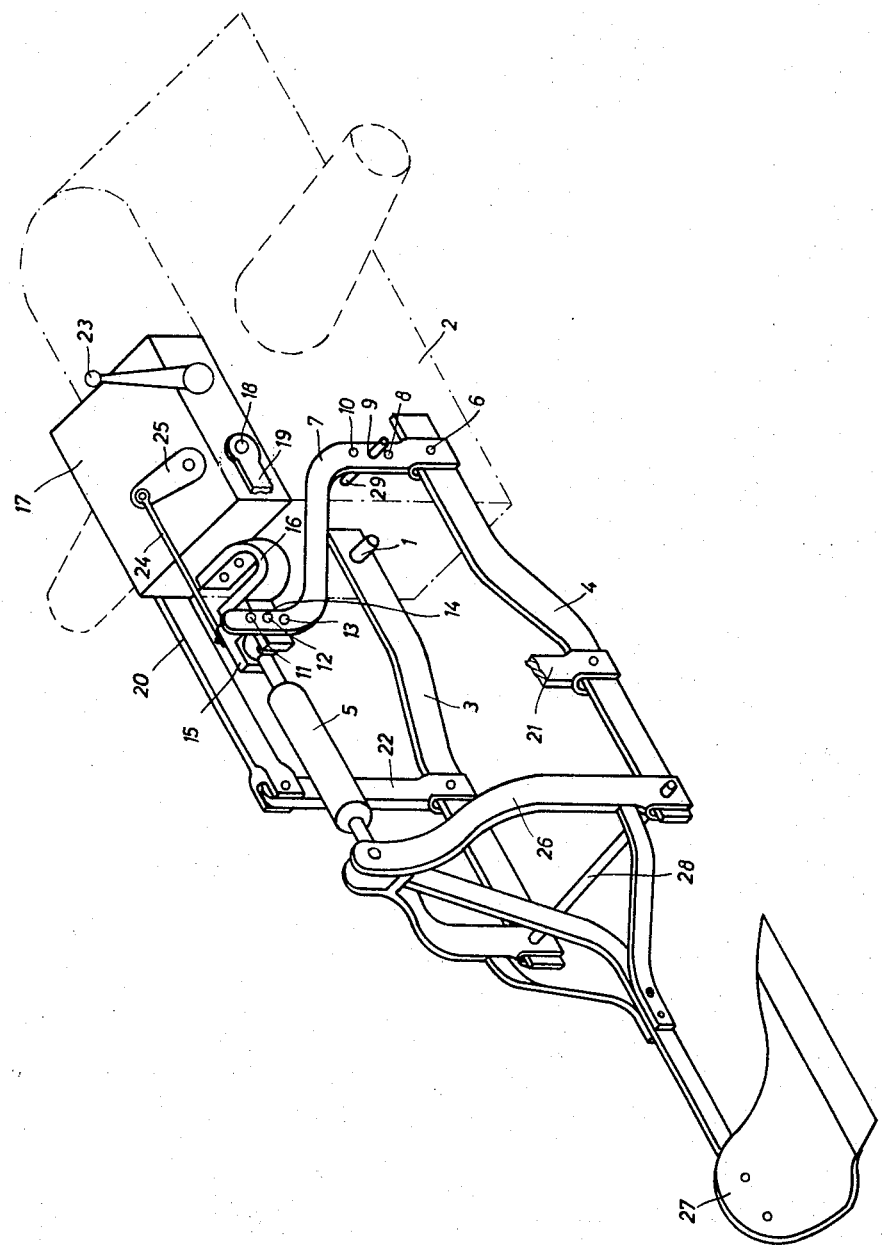

3,351,137
ARRANGEMENT FOR CONTROLLING THE WORKING DEPTH OF A SOIL WORKING IMPLEMENT LINKED TO A TRACTOR
Horst Schulz, Hennef (Sieg), and Herbert Knepper, Bruhl, near Cologne, Germany, assignors to Klockner-Humboldt-Deutz Aktiengesellschaft, Cologne, Germany
Filed Aug. 17, 1964, Ser. No. 389,843
Claims priority, application Germany, Aug. 20, 1963, K 50,581
4 Claims. (Cl. 172—7)

The present invention relates to an arrangement for controlling the working depth of soil working implements linked to tractors. More specifically, the present invention relates to an arrangement of the just mentioned type according to which the soil working implement is linked to a tractor by means of two lower links connected to each other by means of a transverse beam or frame, said tractor for purposes of lifting and lowering said implement being equipped with a power lifter controlled by a measuring element in conformity with the pulling force of said soil working implement.

Arrangements of the above-mentioned type have become known, according to which the lower links of a four-joint train, designed as three- or four-point linkage, have those connecting devices thereof which are adjacent said tractor pivotally connected to one crankarm each which is fixedly connected to the end of a transverse shaft. With this arrangement, the two ends of the transverse shaft are journalled in bearings which are arranged on or in the transmission housing of the tractor, and the movement of the links brought about by the pulling force of the soil working implement is conveyed to pulling force ascertaining measuring element of the power lifter by means of a crankarm fixedly connected to the transverse shaft.

This way of ascertaining the pulling force through the intervention of two lower links has the drawback that each of the lower links requires a structurally complicated movable connecting point which due to its location near the ground is liable to wear in view of soil accumulation. Moreover, such pivot point has to be equipped with a special guiding means or bearing for the link member which may, for instance, be formed by a crankarm.

It is, therefore, an object of the present invention to provide an arrangement of the above outlined type which will overcome the above-mentioned drawbacks.

It is another object of the present invention to provide an arrangement for controlling the working depth of soil working implements linked to a tractor, in which the structural requirements of link connection with the tractor for ascertaining the pulling force by the measuring element will be reduced to a minimum.

It is also an object of the present invention to provide an arrangement which will make it possible, especially with soil working implements linked through a three-point link system, any time within the pressure-pull range of the soil resistance effective in the links to carry out a play-free measurement.

These and other objects and advantages of the invention will appear more clearly from the following specification in connection with the accompanying drawing illustrating in isometric representation an arrangement according to the present invention.

The problem underlying the present invention has been solved primarily by linking one of the lower links in a manner known per se to a stationary linkage point, whereas the other link is movable in the direction of the pulling force and is pivotally connected to the tractor, the movement of this link introduced by the pulling force is conveyed to the measuring element. Such an arrangement makes it possible by means of a single yieldable guide, designed for instance as crankarm, to obtain a precise indication of the pulling force for one of the lower links effecting the measurement, while simultaneously the measuring sensitivity is increased because only a yieldable guide is present the play of which affects the measurement only by the play of the joints required for connecting the implement to the tractor. The increase in the measuring sensitivity by a reduction in the transmission play results in a reduction of the dead time and in an increase of the stability of the control circuit for the working depth.

According to a further development of the invention, it is possible further to increase the measuring sensitivity in the pressure-pull range of a four-joint train which serves for connecting a soil working implement to a tractor and which may be designed for instance as three-point linkage, while the links connected by means of a transverse beam or frame form the lower links. This further increase in the measuring sensitivity may be obtained by making one of the lower links and the upper link in the direction of the pulling force and pivotally connecting the same to the tractor and by conveying the movement of said two links initiated by the pulling force to a measuring element common thereto. With such an arrangement, the plays of the connecting joints which harmfully affect the measurements, compensate each other. Thus, the measuring element has the advantageous possibility with a heavy soil working implement connected to a tractor, for instance a multi-share plow, to ascertain the working resistance encountered by the plow with shallow as well as with deep working depths. This is possible with a maximum of sensitivity.

Referring now to the drawing in detail, the arrangement shown therein comprises a stationary pivot 1 which pertains to a transmission housing 2 (indicated in dot-dash lines) of a tractor not shown. Pivotally connected to pivot 1 is a link member or arm 3 of a three-point linkage train, the link forming the lower link when looking in the driving direction. The three-point linkage train is composed of the right-hand lower link or arm 4 and the upper link or arm 5. Link 4 is contrary to the lower link member 3 pivotally connected by a pivot 6 to a two-arm transmission lever 7. Lever 7 is by means of one of the bores 8, 9 and 10 arranged near pivot 6 tiltably mounted on a stationary stud 29 of the transmission housing 2. The upper free end of the transmission lever 7 is provided with a plurality of connecting bores 11, 12, 13. The intermediate bore 12 is engaged by a stud 14 of a fork-shaped member 15 which serves for pivotally connecting upper link 5 adjacent the tractor. The fork-shaped member 15 to which the upper link 5 on the side of the tractor is linked is connected to one end of a U-shaped leaf spring 16 serving as pulling force measuring elements, whereas the other end of spring 16 is connected to the housing of a power lifter 17 mounted on the transmission housing 2. Power lifter 17 is adapted by means of its lifter shaft 18 to tilt the lifter arms 19, 20 mounted thereon and through the intervention of the coupling bars 21, 22 pivotally connected to the other end of said power lifter, to lift or lower the three-point linkage train with the soil working implement linked thereto. The nominal adjustment of the lifter arm position or of a preselected pulling force is effected by means of a manually operable lever 23 of the power lifter 17 into which the actual values of the pulling force are fed by the measuring element 16, designed as U-shaped leaf spring, through the intervention of a control bar 24 connected to the fork-shaped member 15 and through lever 25. At the side of the implement, the transverse frame 26 of a plow 27 is pivotally connected to the upper link 5 and the two lower link members 3 and 4. In this connection, the coupling of the ends of the lower link members 4 and 3 adjacent the implement is effected by means of a round transverse arm 28 through which the soil resistance acting upon the plow is conveyed to the lower link members 3 and 4. It will be appreciated that only the right-hand lower link member 4 or the upper link 5 carries out longitudinal movements the magnitude of which is either through the transmission lever 7 or directly conveyed to the fork-shaped member 15 which is connected to the leaf spring 16. Fork-shaped member 15 conveys the value measured by the measuring element through control bar 24 and lever 25 to the control member of the power lifter 17.

It may be mentioned that principally the measuring of the soil resistance may be effected through one only of the movably linked lower link members 4 if it is intended to operate in medium and great working depths. In such an instance, however, the upper link 5 is stationary and pivotally connected to the transmission housing 2.

It is, of course, to be understood that the present invention is, by no means, limited to the particular construction shown in the drawing but also comprises any modifications within the scope of the appended claims.

What is claimed is:

1. In combination; a draft implement having a hitch arrangement comprising a pair of substantially horizontal laterally spaced lower links and an upper link substantially parallel to the lower links, a ground working implement having a three point hitch frame connected thereto with the hitch points distributed in a vertical plane and with the lower points thereof pivoted to the rear ends of said lower links and the upper point thereof pivoted to the rear end of said upper link, a first pivot on the draft implement connecting the front end one of said lower links thereto, a second pivot on the draft implement located at a higher level than said first pivot, a vertically extending two arm lever pivoted between its ends to said second pivot, means pivotally connecting the lower one of said arms of the lever to the front end of the other lower link, a resilient element between the draft implement and the upper arm of said two arm lever opposing movement of said upper arm due to the force exerted on said lower arm by said other lower link when said draft implement exerts draft on said ground working implement, means pivotally connecting the front end of said upper link to said other arm of said lever, a power operated lift mechanism on the draft implement connected to said hitch arrangement for lifting and lowering said ground working implement, control means operable for actuating said lift mechanism for adjusting the depth of the ground working implement in the ground, said control means comprising a control element moveable in one direction from a neutral position to cause said lift mechanism to lower the ground working implement and moveable in the other direction from a neutral position to cause said lift mechanism to raise the ground working implement, and means connecting said control element with said upper arm of said two arm lever for movement of said element by said upper arm when the latter moves due to the opposed influences of the force exerted on said upper arm by said resilient element and the force exerted on the lower arm by the draft exerted on the ground working implement by said draft implement via said other lower link.

2. In combination; a draft implement having a hitch arrangement comprising a pair of substantially horizontal laterally spaced lower links and an upper link substantially parallel to the lower links, a ground working implement having a three point hitch frame connected thereto with a pair of laterally spaced lower points pivoted to the rear ends of said lower links and an upper point pivoted to the rear end of said upper link, a first pivot on one side of the draft implement connecting the front of one of said lower links thereto, a second and horizontal pivot on the other side of the draft implement at a higher level than said first pivot, a vertically extending two arm lever pivoted between its ends to said second pivot, means pivotally connecting the lower one of said arms of the lever to the front end of the other lower link, a resilient element between the draft implement and the upper arm of said two arm lever opposing movement of said upper arm due to the force exerted on said lower arm by said other lower link when said draft implement exerts draft on said ground working implement, means pivotally connecting the front end of said upper link to said upper arm, a power operated lift mechanism on the draft implement connected to said hitch arrangement for lifting and lowering said ground working implement, control means operable for actuating said lift mechanism for controlling the depth of the ground working implement in the ground, said control means comprising a control element moveable in one direction from a neutral position to cause said lift mechanism to lower the ground working implement and moveable in the other direction from a neutral position to cause said lift mechanism to raise the ground working implement, and means connecting said control element with said upper arm of said two arm lever for movement of the control element by said upper arm of said lever when the latter moves due to the opposed influence of on the one hand said resilient element and on the other hand the force exerted on the lever by the draft exerted on the ground working implement by said other lower link together with the force exerted on said lever by said upper link.

3. The combination according to claim 2 in which a transverse bar is provided interconnecting said lower links at the rear ends thereof.

4. In combination; a tractor, a ground working implement behind the tractor, a pair of laterally spaced horizontal links for transmitting draft from the tractor to the implement and connected at their rear ends to said implement and extending from the implement forwardly to the tractor and one of said links having its tractor end pivotally connected to the tractor for movement in the vertical direction, a generally vertical arm pivoted between its ends to said tractor and having its lower end pivoted to the tractor end of the other of said links, power operated lift means on the tractor connected to said links operable for moving the links about their pivotally connected tractor ends to raise and lower said implement, a control element for said lift means moveable for actuating the lift means, means connecting the upper end of said arm with said control element, and resilient means acting between said arm and said tractor urging said arm in a direction opposite to the direction in which it is urged by the draft exerted on said links by said tractor.

References Cited
UNITED STATES PATENTS

| | | | |
|---|---|---|---|
| 2,480,387 | 8/1949 | Smith | 172—7 |
| 3,098,528 | 7/1963 | Richey et al. | 172—7 |

ABRAHAM G. STONE, *Primary Examiner.*

WILLIAM A. SMITH III, *Examiner.*

J. R. OAKS, *Assistant Examiner.*